No. 806,786. PATENTED DEC. 12, 1905.
M. EICHNER.
BAKER'S OVEN.
APPLICATION FILED JUNE 13, 1905.
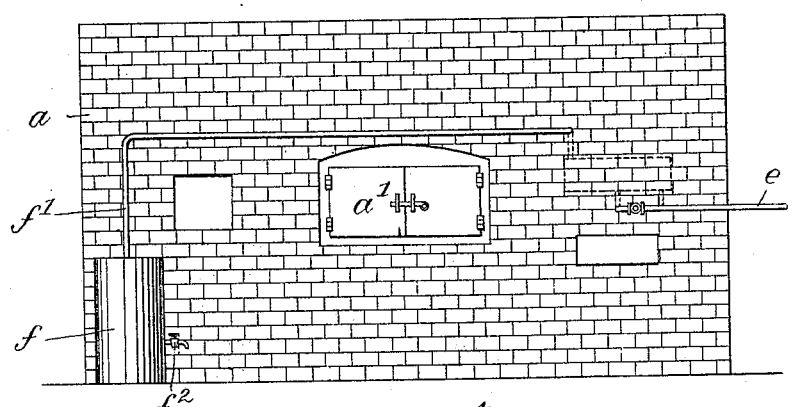
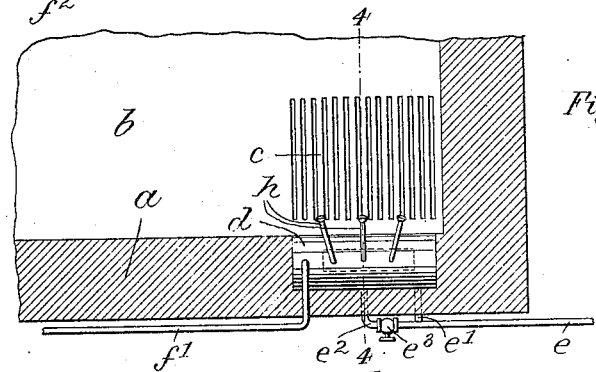
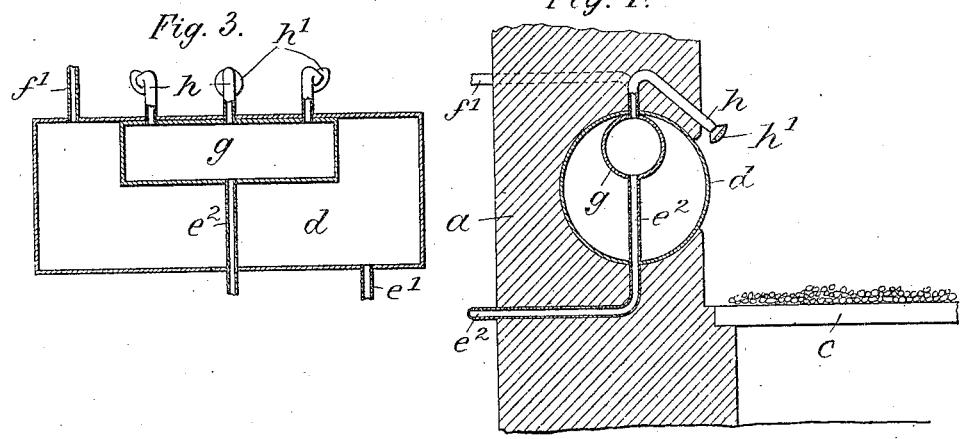

UNITED STATES PATENT OFFICE.

MAX EICHNER, OF YONKERS, NEW YORK.

BAKER'S OVEN.

No. 806,786.          Specification of Letters Patent.          Patented Dec. 12, 1905.

Application filed June 13, 1905. Serial No. 264,978.

*To all whom it may concern:*

Be it known that I, MAX EICHNER, a citizen of Austria-Hungary, residing at Yonkers, Westchester county, State of New York, have invented new and useful Improvements in Bakers' Ovens, of which the following is a specification.

This invention relates to an improved baker's oven, and more particularly to improved means for extinguishing the fire and for supplying the baking-chamber at the beginning of the baking operation with a volume of steam sufficient to brown the bread.

In the accompanying drawings, Figure 1 is a front view of a baker's oven embodying my invention. Fig. 2 is an enlarged horizontal section of part of the same above the sole of the baking-chamber; Fig. 3, a detail vertical section through the boilers; and Fig. 4 an enlarged vertical cross-section on line 4 4, Fig. 2.

The letter $a$ indicates the front wall of a baker's oven, having the usual door $a'$. The sole $b$ of the baking-chamber is provided at one corner with a grate $c$, which is thus in communication with the baking-chamber and is adapted to support the fuel by which the oven is heated preliminary to the baking operation.

Opposite grate $c$ there is embedded in wall $a$ an outer cylindrical hot-water boiler $d$, that receives its supply of cold water from supply-pipe $e$ by means of a branch $e'$. The hot water is led from boiler $d$ by service-pipe $f'$ to a suitable tank $f$, having cock $f^2$ for use by the baker.

Within the outer boiler $d$ there is inclosed a second inner hot-water boiler $g$, that is uniformly heated by the hot water contained in the outer boiler. The inner boiler $g$ receives its charge of cold water from supply-pipe $e$ by branch $e^2$, the flow of cold water to boiler $g$ being controlled by a cock $e^3$ in pipe $e$ between branches $e'$ $e^2$.

The boiler $g$ is provided with a series of inclined nozzles $h$, that are arranged above and are adapted to discharge jets of hot water upon grate $c$ through roses $h'$.

In use the fire is started on grate $c$, and after boiler $g$ is filled cock $e^3$ is closed, so that the water will become heated in boiler $d$ for convenient use by the baker, the water in boiler $g$ also becoming heated. If the baking operation is to commence, it is necessary that the fire be extinguished and that a small body of steam be discharged into the baking-chamber for browning the bread. To effect this result, cock $e^3$ is opened, when the hot water in boiler $g$ will be blown upon the fire supported on grate $c$, so as to rapidly extinguish the same and generate steam. This steam will fill the baking-chamber to an extent sufficient for browning the bread. When a sufficient quantity of hot water has been introduced into the oven, cock $e^3$ is closed to cut off the water-supply, and the oven will thus be properly heated and moistened to complete the baking process.

The water in the outer boiler is intended for frequent use by the baker during the baking operation, so that its temperature is apt to be at times very low. The water in the inner boiler is tapped but once during each baking operation, and being at all times surrounded by a body of more or less heated water its temperature is apt to be considerably higher than that in the outer boiler, especially as it cannot cool as quickly as the water in the outer boiler can be drawn off.

What I claim is—

1. A baker's oven provided with a baking-chamber, a fire-grate in communication with said chamber, and with a nozzle adapted to deliver a volume of hot water upon said grate, substantially as specified.

2. A baker's oven provided with a baking-chamber, a fire-grate in communication with said chamber, a boiler, and a nozzle on the boiler adapted to deliver a volume of hot water upon said grate, substantially as specified.

3. A baker's oven provided with a baking-chamber, a fire-grate in communication with said chamber, an outer boiler, an inner boiler, a nozzle on the inner boiler adapted to deliver a volume of hot water upon the grate, and means for controlling the supply of feed-water to the inner boiler, substantially as specified.

Signed by me at New York city, Manhattan, New York, this 2d day of June, 1905.

MAX EICHNER.

Witnesses:
WILLIAM SCHULZ,
FRANK V. BRIESEN.